US011151121B2

(12) United States Patent
Lee et al.

(10) Patent No.: US 11,151,121 B2
(45) Date of Patent: Oct. 19, 2021

(54) SELECTIVE DIAGNOSTICS FOR COMPUTING SYSTEMS

(71) Applicant: International Business Machines Corporation, Armonk, NY (US)

(72) Inventors: Eun Kyung Lee, Bedford Corners, NY (US); Jong Yoon Lee, Morton Grove, IL (US); Bruce D. D'Amora, New Milford, CT (US); Giacomo Domeniconi, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 16/557,531

(22) Filed: Aug. 30, 2019

(65) Prior Publication Data

US 2021/0064595 A1    Mar. 4, 2021

(51) Int. Cl.
*G06F 16/00* (2019.01)
*G06F 16/23* (2019.01)
(Continued)

(52) U.S. Cl.
CPC ...... *G06F 16/2365* (2019.01); *G06F 16/2237* (2019.01); *G06F 16/9024* (2019.01)

(58) Field of Classification Search
CPC ............... G06F 11/079; G06F 11/0709; G06F 11/0793; G06F 11/2294; G06F 11/3688;
(Continued)

(56) References Cited

U.S. PATENT DOCUMENTS 6,601,018 B1    7/2003  Logan
7,334,162 B1    2/2008  Vakrat et al.
(Continued)

OTHER PUBLICATIONS

Taylor et al. "Recent developments towards novel high performance computing and communications solutions for smart distribution network operation." Innovative Smart Grid Technologies (ISGT Europe), 2011 2nd IEEE PES International Conference and Exhibition on. IEEE, Dec. 2011, 8 pages.
(Continued)

*Primary Examiner* — Shyue Jiunn Hwa
(74) *Attorney, Agent, or Firm* — Daniel Morris; Otterstedt, Wallace & Kammer, LLP

(57) ABSTRACT

Method and systems for generating an adjacency matrix A and a directional relation graph representing a relationship between one or more diagnostics. The adjacency matrix with all zero's is initialized. One or more entries in the adjacency matrix A are revised by, for each source diagnostic s, decreasing a corresponding count A(s,d) in the adjacency matrix A to decrease a corresponding directional relation in response to the diagnostic s failing and one or more other diagnostics d passing; increasing the corresponding count A(s,d) in the adjacency matrix A to increase the corresponding directional relation in response to the diagnostic s failing and one or more other diagnostics d failing; and maintaining a current value of the corresponding count A(s,d) in the adjacency matrix A in response to the diagnostic s passing or having no corresponding data. The directional relation graph is generated based on the adjacency matrix A.

19 Claims, 12 Drawing Sheets

(51) Int. Cl.
*G06F 16/22* (2019.01)
*G06F 16/901* (2019.01)

(58) Field of Classification Search
CPC ........ G06F 17/18; G06F 11/00; G06F 11/008;
G06F 11/07; G06F 11/0721; G06F
11/0748; G06F 11/0751; G06F 11/0772;
G06F 11/0781; G06F 11/0787; G06F
11/2002; G06F 11/3006; G06F 11/3013;
G06F 11/3058; G06F 11/3684; G06F
17/16; G06F 2201/81; G06F 11/2094;
G06F 11/3608; G06F 11/3612; G06F
11/3636; G06F 11/3664; G06F 11/3696;
G06F 8/71; G06F 16/9024; G06F 21/64;
G06F 8/33; G06F 8/65; G06F 9/547;
G06F 16/367; G06F 9/44505; G06F
9/5038; G06F 16/2228; G06F 16/9535;
G06F 3/0482; G06F 16/3325; G06F
16/335; G06F 16/35; G06F 16/168; G06F
16/173; G06F 16/282; G06F 16/31; G06F
16/313; G06F 16/3322; G06F 16/355
See application file for complete search history.

(56) References Cited

U.S. PATENT DOCUMENTS

| | | | |
|---|---|---|---|
| 7,640,457 B2 | 12/2009 | Ewrin et al. | |
| 9,274,902 B1 | 3/2016 | Morley et al. | |
| 9,390,814 B2 | 7/2016 | Ellis | |
| 2004/0177244 A1* | 9/2004 | Murphy | G06F 9/5077 |
| | | | 713/100 |
| 2009/0313600 A1* | 12/2009 | Ayers | G06F 8/456 |
| | | | 717/106 |
| 2010/0049770 A1* | 2/2010 | Ismalon | G06Q 30/0269 |
| | | | 707/765 |
| 2013/0069792 A1 | 3/2013 | Blevins et al. | |
| 2016/0132418 A1 | 5/2016 | Reichart et al. | |
| 2017/0091007 A1 | 3/2017 | Dasari | |
| 2017/0365153 A1 | 12/2017 | Sundaresh et al. | |
| 2020/0030632 A1* | 1/2020 | Munbodh | G16H 20/40 |
| 2020/0356675 A1* | 11/2020 | Shakarian | G06F 21/54 |

OTHER PUBLICATIONS

Hanemann. Automated IT Service Fault Diagnosis Based on Event Correlation Techniques. Diss. Imu, Jul. 2007, 343 pages.

Guan et al., "auto-AID: A data mining framework for autonomic anomaly identification in networked computer systems." Performance Computing and Communications Conference (IPCCC), 2010 IEEE 29th International. IEEE, Dec. 2010, 8 pages.

Cheng et al., "Efficient Active Probing for Fault Diagnosis in Large Scale and Noisy Networks," 2010 Proceedings IEEE INFOCOM, San Diego, CA, Mar. 2010, pp. 1-9. doi: 10.1109/INFCOM.2010.5462041.

Rish et al., "Adaptive diagnosis in distributed systems," in IEEE Transactions on Neural Networks, vol. 16, No. 5, pp. 1088-1109, Sep. 2005. doi: 10.1109/TNN.2005.85342.

Bellala et al., A rank-based approach to active diagnosis. IEEE Trans. Pattern Anal. Mach. Intell. Sep. 2013, 35(9): pp. 2078-2090.

Zheng et al., Efficient test selection in active diagnosis via entropy approximation. In Proceedings of the Twenty-First Conference on Uncertainty in Artificial Intelligence (UAI'05), Jul. 2005, pp. 675-682.

* cited by examiner

| Time | Diag 1 | Diag 2 | Diag 3 | Diag 4 | Diag 5 |
|---|---|---|---|---|---|
| Aug 9 07:00:00 | 1 | -1 | -1 | -1 | 1 |
| Aug 10 07:00:00 | 1 | 1 | 1 | -1 | -1 |
| Aug 11 07:00:00 | 1 | 0 | 0 | -1 | 1 |

| Source \ Target | Diag 1 | Diag 2 | Diag 3 | Diag 4 | Diag 5 |
|---|---|---|---|---|---|
| Diag 1 | 0 | 0 | 0 | 0 | 0 |
| Diag 2 | 0 | 0 | 0 | 0 | 0 |
| Diag 3 | 0 | 0 | 0 | 0 | 0 |
| Diag 4 | 0 | 0 | 0 | 0 | 0 |
| Diag 5 | 0 | 0 | 0 | 0 | 0 |

| | Time | Diag 1 | Diag 2 | Diag 3 | Diag 4 | Diag 5 |
|---|---|---|---|---|---|---|
| 624 | Aug 9 07:00:00 | 1 | -1 | -1 | -1 | 1 |
| 624 | Aug 10 07:00:00 | 1 | 1 | 1 | -1 | -1 |
| 624 | Aug 11 07:00:00 | 1 | 0 | 0 | -1 | 1 |

| Source \ Target | Diag 1 | Diag 2 | Diag 3 | Diag 4 | Diag 5 | |
|---|---|---|---|---|---|---|
| Diag 1 | 0 | 0 | 0 | 0 | 0 | 632 |
| Diag 2 | 0 | 0 | 1 | 1 | 0 | 632 |
| Diag 3 | 0 | 1 | 0 | 1 | 0 | 632 |
| Diag 4 | 0 | 0 | 0 | 0 | 0 | |
| Diag 5 | 0 | 0 | 0 | 1 | 0 | |

SELECTIVE DIAGNOSTICS FOR COMPUTING SYSTEMS

BACKGROUND

The present invention relates to the electrical, electronic and computer arts, and more specifically, to intelligently selecting diagnostics for computing systems.

There are many diagnostic routines, such as prolog routines (performed before a processing job), epilog routines (performed after a processing job), regular system checkups, and the like, which increase the unavailable time for application processing on a system. Some of the diagnostics, however, may be redundant and waste computing resources.

Moreover, malfunctioning hardware in certain conditions (such as high temperature) has a higher likelihood of malfunctioning in the future and, in general, the failure rate of a hardware component increases exponentially with higher temperature. Thus, an application that intensively utilizes specific hardware resources (such as a CPU, a graphics processing unit (GPU), and the like) has a higher likelihood of causing that hardware to malfunction than an application that is less intensive.

SUMMARY

Principles of the invention provide techniques for intelligently selecting diagnostics for computing systems. In one aspect, an exemplary method for generating an adjacency matrix A and a directional relation graph (DRG) representing a relationship between one or more diagnostics, according to an aspect of the invention, includes the operations of initializing the adjacency matrix with all zero's, where a row of the adjacency matrix A corresponds to a source diagnostic s of the one or more diagnostics, a column of the adjacency matrix A corresponds to a destination diagnostic d of the one or more diagnostics, and m represents a total count of the diagnostics; revising one or more entries in the adjacency matrix A by, for each source diagnostics, decreasing a corresponding count $A(s,d)$ in the adjacency matrix A to decrease a corresponding directional relation in response to the diagnostic s failing and one or more other diagnostics d passing; increasing the corresponding count $A(s,d)$ in the adjacency matrix A to increase the corresponding directional relation in response to the diagnostic s failing and one or more other diagnostics d failing; and maintaining a current value of the corresponding count $A(s,d)$ in the adjacency matrix A in response to the diagnostic s passing or having no corresponding data; and generating the directional relation graph based on the adjacency matrix A.

In one aspect, a non-transitory computer readable medium comprises computer executable instructions which when executed by a computer cause the computer to perform the method of: initializing the adjacency matrix with all zero's, where a row of the adjacency matrix A corresponds to a source diagnostic s of the one or more diagnostics, a column of the adjacency matrix A corresponds to a destination diagnostic d of the one or more diagnostics, and m represents a total count of the diagnostics; revising one or more entries in the adjacency matrix A by, for each source diagnostics, decreasing a corresponding count $A(s,d)$ in the adjacency matrix A to decrease a corresponding directional relation in response to the diagnostic s failing and one or more other diagnostics d passing; increasing the corresponding count $A(s,d)$ in the adjacency matrix A to increase the corresponding directional relation in response to the diagnostic s failing and one or more other diagnostics d failing; and maintaining a current value of the corresponding count $A(s,d)$ in the adjacency matrix A in response to the diagnostic s passing or having no corresponding data; and generating the directional relation graph based on the adjacency matrix A.

In one aspect, an apparatus for generating an adjacency matrix A and a directional relation graph representing a relationship between one or more diagnostics comprises at least one processor and a memory storing instructions which, when executed by the at least one processor, cause the mobile device to perform a method comprising: initializing the adjacency matrix with all zero's, where a row of the adjacency matrix A corresponds to a source diagnostic s of the one or more diagnostics, a column of the adjacency matrix A corresponds to a destination diagnostic d of the one or more diagnostics, and m represents a total count of the diagnostics; revising one or more entries in the adjacency matrix A by, for each source diagnostic s, decreasing a corresponding count $A(s,d)$ in the adjacency matrix A to decrease a corresponding directional relation in response to the diagnostic s failing and one or more other diagnostics d passing; increasing the corresponding count $A(s,d)$ in the adjacency matrix A to increase the corresponding directional relation in response to the diagnostic s failing and one or more other diagnostics d failing; and maintaining a current value of the corresponding count $A(s,d)$ in the adjacency matrix A in response to the diagnostic s passing or having no corresponding data; and generating the directional relation graph based on the adjacency matrix A.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

a. intelligent selection of diagnostic routines, diagnostic services, and the like;

b. higher processing performance due to a reduction in diagnostics runtime;

c. generation of a diagnostic directional relation graph for visually representing the relationships between different diagnostic routines and services; and between diagnostic routines and services and computational errors and malfunctions;

d. an algorithm to determine the necessary diagnostic sets for minimizing diagnostic run time, and hence, minimize server downtime and jitter;

e. an algorithm to determine a diagnostic time period for running the diagnostic sets in order to reduce diagnostic run time and/or to detect any defect early;

f. an algorithm to locate specific hardware and/or software faults; and g. elimination of redundant diagnostics.

These and other features and advantages of the present invention will become apparent from the following detailed description of illustrative embodiments thereof, which is to be read in connection with the accompanying drawings.

BRIEF DESCRIPTION OF THE DRAWINGS

Preferred embodiments of the present invention will be described below in more detail, with reference to the accompanying drawings.

DETAILED DESCRIPTION

Figure 1:
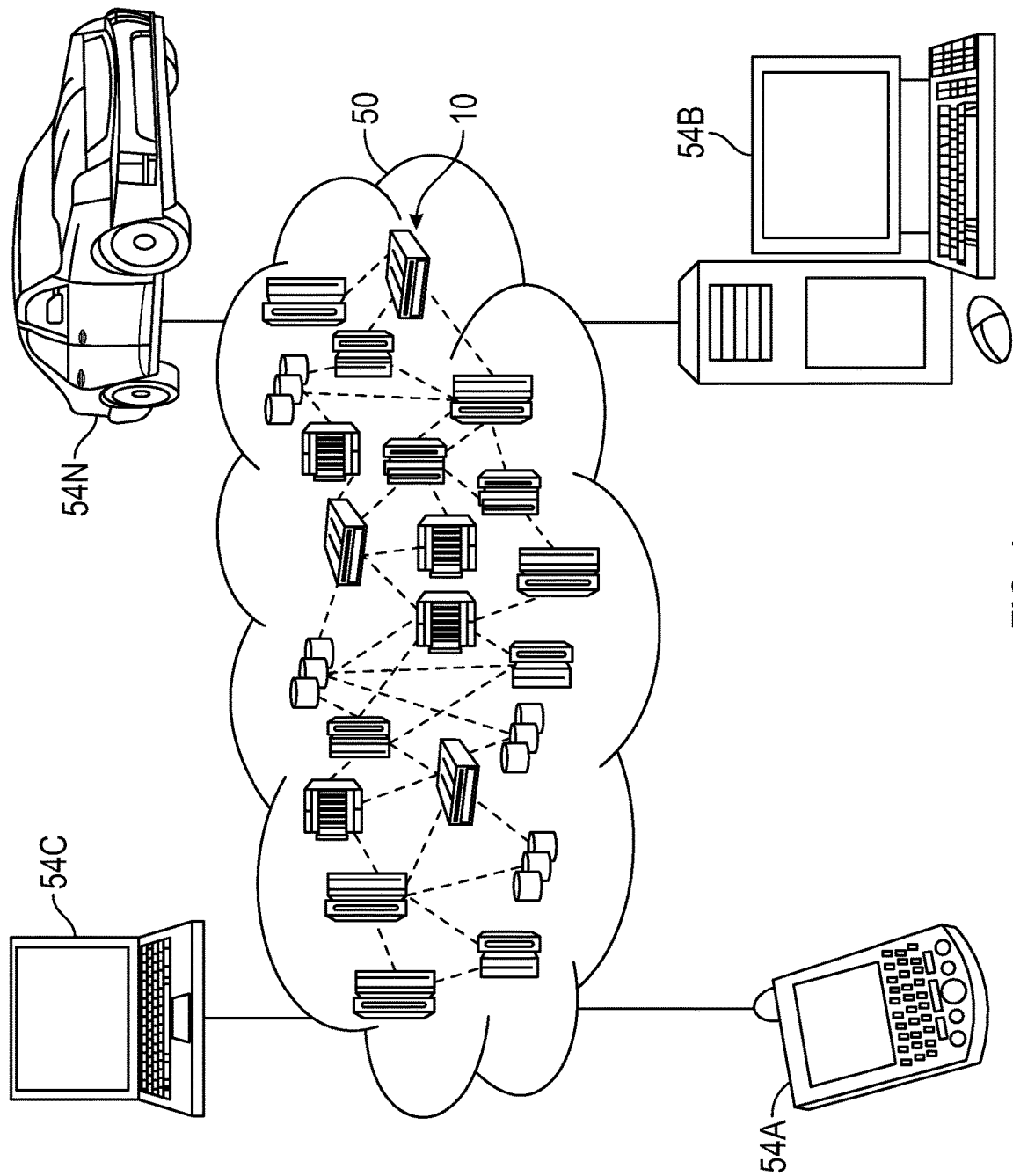
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
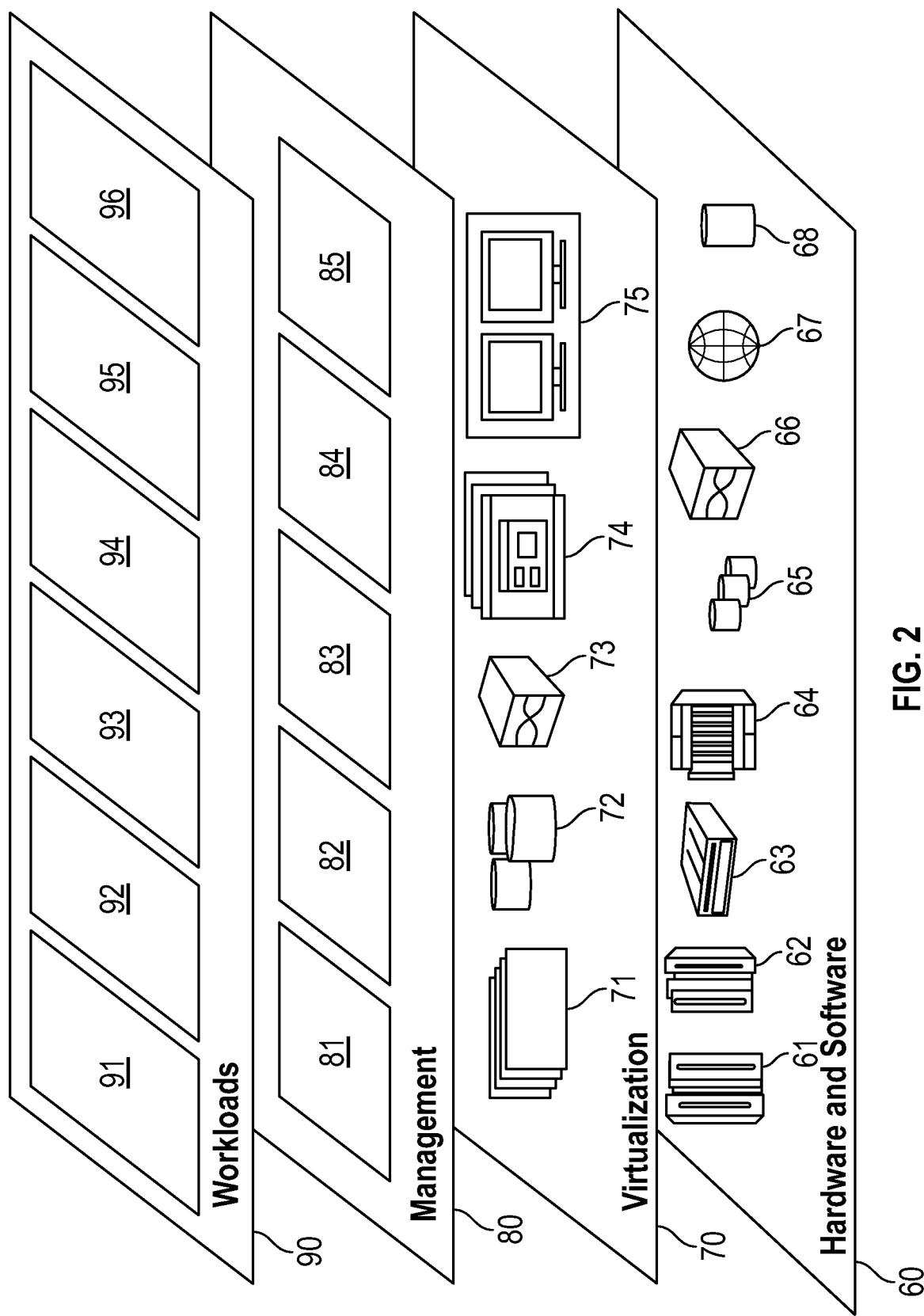
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and diagnostic selector 96.

Generally, methods and systems for selecting diagnostic routines, diagnostic services, and the like (known as diagnostics herein) are disclosed. In certain instances, correlations between the functional coverage of different diagnostics, correlations between common types of errors and malfunctions and the diagnostics needed to identify such errors and malfunctions, and the like make it unnecessary to run similar diagnostics. In one example embodiment, an analysis is performed and the type of diagnostics, the frequency of each type of diagnostic, and the like are determined such that diagnostic coverage is maintained or improved while reducing the computing and memory resources needed for diagnostic operations, thereby improving the computing performance of the overall system. For example, diagnostics may be run more frequently on a processor that is running hot (in terms, for example, of a temperature range specified by a manufacturer) than a processor that is running at normal or cool temperatures. In another example, memory-intensive applications may reveal hardware failures that are not exposed by less memory-intensive applications.

Figure 3:
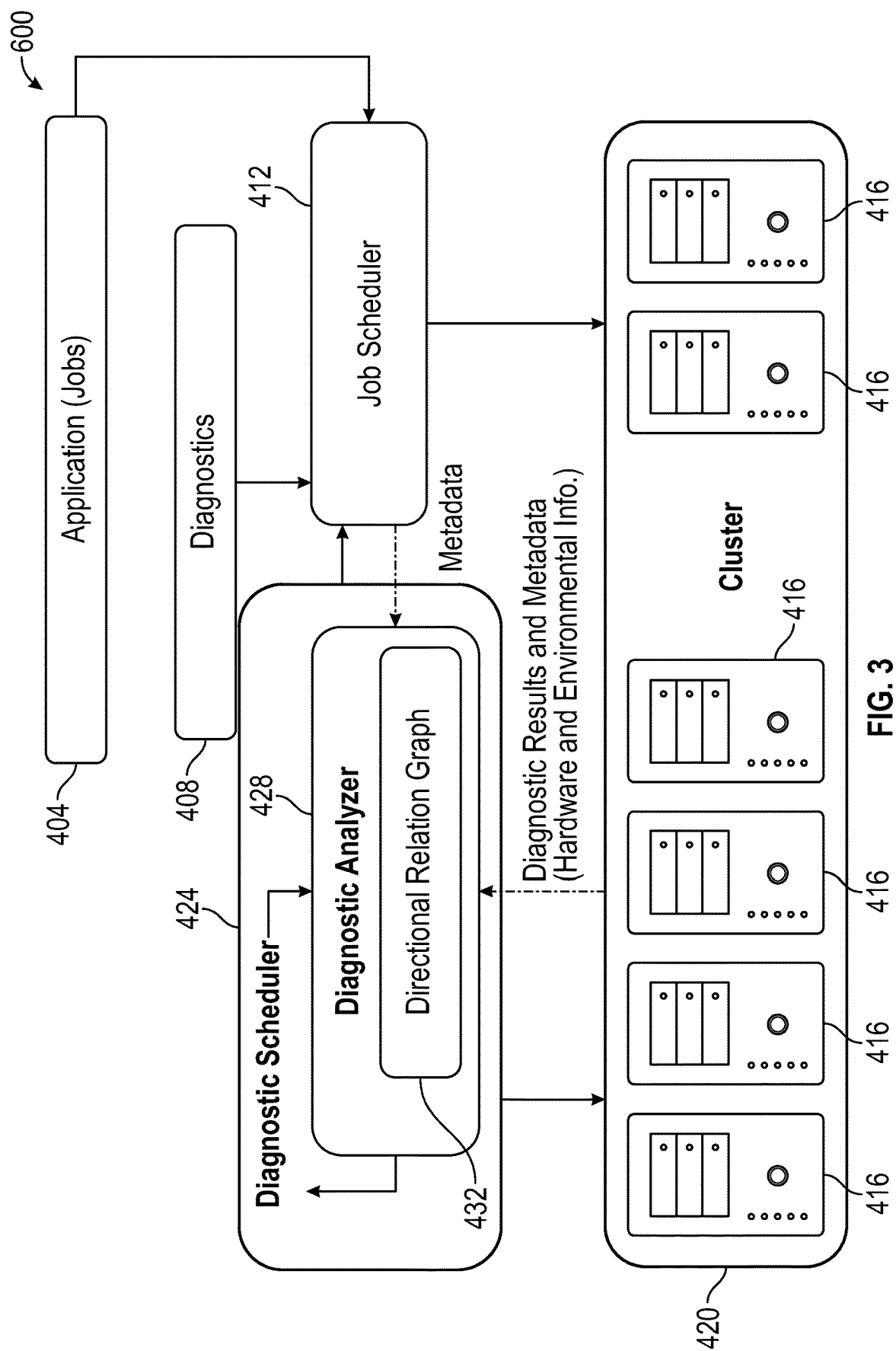
FIG. 3 is an example workflow for running applications, diagnostics, and the like, in accordance with an example embodiment.

FIG. 3 is an example workflow 400 for running applications 404, diagnostics 408, and the like, in accordance with an example embodiment. In one example embodiment, one or more applications (also known as jobs herein) 404 are scheduled for running by a job scheduler 412. The applications 404 are run on one or more servers 416 of a cluster of servers 420. In one example embodiment, a diagnostic analyzer 428 collects information on software (such as the applications 404) and hardware (such as CPUs), environmental data (such as the temperature of a processor), and the like, and analyzes the data to select a set of diagnostic routines and services for specific hardware, applications 404, and the like. A diagnostic scheduler 424 executes the sets of diagnostics 1) regularly, 2) before and/or after the running of the applications 404, 3) as scheduled, and the like to check for hardware and/or software malfunctions and errors. For example, certain diagnostics can be run every morning. In addition, buckets (lists) of diagnostics can be defined by, for example, an administrator to identify the diagnostics to utilize under certain circumstances. The buckets may have many diagnostics (known as long buckets) or fewer diagnostics (known as short buckets), as defined by each administrator.

The environmental data includes, but is not limited to, metrics such as processor temperature, power consumed, stats of air/water flow for cooling, and the like. The hardware data includes, but is not limited to, a node identifier, a processor identifier, hardware type, and the like. The application (job) data includes, but is not limited to, a code region, targeting hardware, queue status, and the like. The system software data includes, but is not limited to, device drivers, firmware, schedulers, distributed parallel file systems, user identifiers, user configuration information, and the like.

Methods for Deciding Diagnostic Period:

In one example embodiment, the diagnostic analyzer 428 determines a diagnostic period (P_diag) for performing diagnostics. The diagnostic period (P_diag) can be defined as f(env_data, hw_data, app_data) where the function $f$ operates on the environmental data (env_data), hardware data (hw_data), and application data (app_data). In one example embodiment, the diagnostic period (P_diag; also referred to as interval_diag herein) for a node and diagnostic pair (node1, diag1) is defined as:

$$P\_diag(node1, diag1) = baseline\_period - coefficient * (temperature * count\_of\_failures)$$

where baseline_period (also referred to as baseline_interval herein) is a baseline time period for performing a diagnostic, temperature is a running temperature of a specified hardware component (such as a CPU), and count_of_failures is the number of failures that have occurred and that can be detected by a given diagnostic (diag1). In one example embodiment, the baseline_period is set by a user, such as an administrator. For example, the baseline_period may be set to five seconds, daily, and the like. The coefficients (also referred to as coefi herein) are a weight of the relative importance of the variables to the user and can be any value between 0 and 1. For example, if the coefficient of the underlying hardware is set to 0.3, the coefficient of temperature may be set to 0.4 to indicate that temperature is relatively more important than the underlying hardware.

Methods for Selecting Diagnostic Sets:

In one example embodiment, the diagnostic analyzer 428 determines the diagnostics to be performed based on a directional relation graph, as described more fully below in connection with FIGS. 4-9C. The diagnostic analyzer 428 inspects, for example, application binaries and estimates, for example, the runtime/utilization for hardware (such as a CPU, a graphics processing unit (GPU), a field-programmable gate array (FPGA), and the like). The diagnostic analyzer 428 excludes diagnostics for unused hardware, excludes diagnostics for under-utilized hardware in certain instances, and the like. The excluding ratio can be dependent on the mean failure rate if historical data is available.

Figure 4:
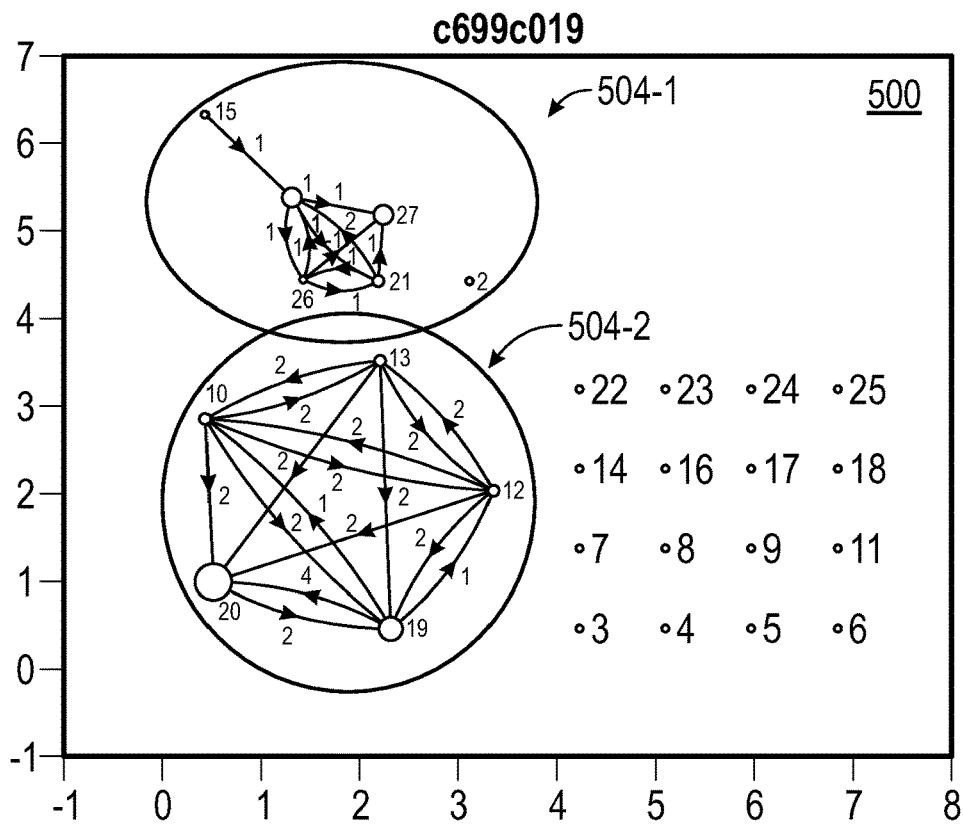
FIG. 4 is an example of a first directional relation graph representing the relationships between various diagnostic routines and services that form different clusters, in accordance with an example embodiment.

FIG. 4 is an example of a first directional relation graph 500 representing the relationships between various diagnostic routines and services that form different clusters, in accordance with an example embodiment. The results of diagnostic tests can be represented by the directional relation graph 500 where nodes 1 through 27 represent individual diagnostic routines and/or services. In one example embodiment, the results are one of pass (represented by 1), fail (represented by −1), and no data (represented by 0). The directional relation graph 500 is initially represented as an adjacency matrix, as described more fully below in conjunction with FIGS. 6C-9C. The size of each node in the directional relation graph 500 represents the frequency of failure of the corresponding diagnostic routine and/or service within a certain time window. Edge weights represent the strength of the relation between the diagnostic routines and services. In one example embodiment, the weight is based on the number of mutual diagnostic failures. For example, if two given diagnostics fail (the diagnostics are correlated), the weight will be larger. As illustrated in FIG. 4, a first set of nodes 504-1 and a second set of nodes 504-2 show that no correlation (e.g., no shared nodes) with each other may correspond to and be indicative of different problems or issues.

Figure 5:
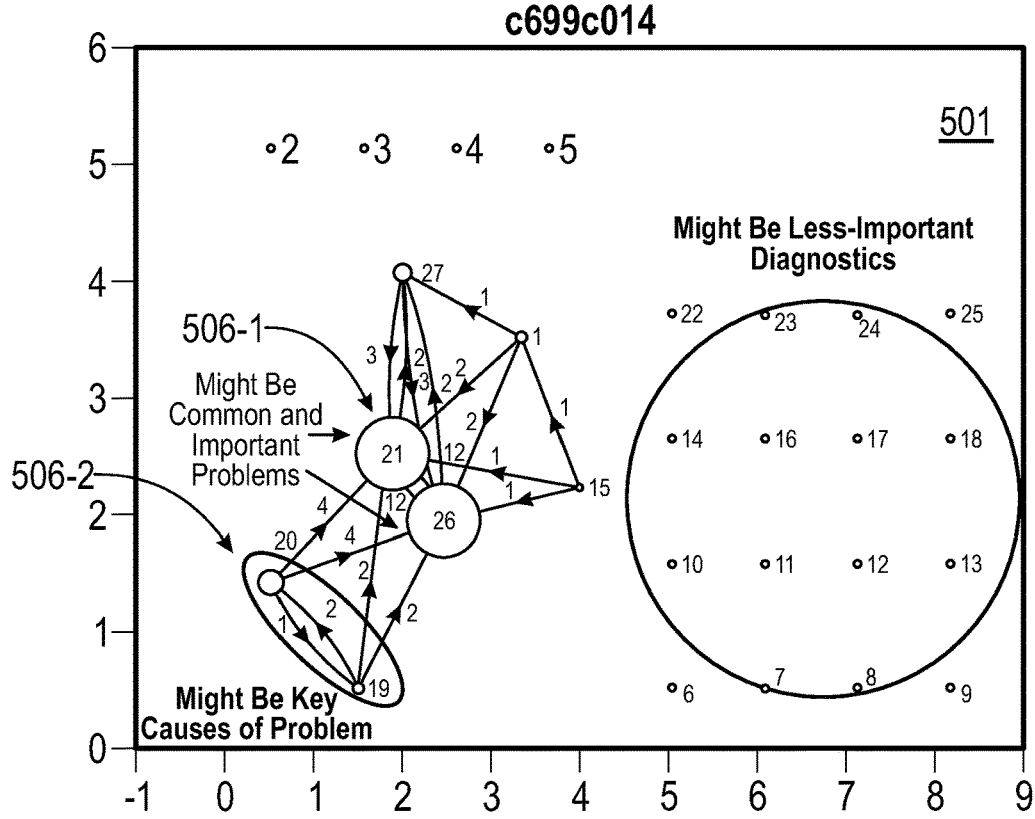
FIG. 5 is an example of a second directional relation graph representing the relationships between various diagnostic routines and services that shows various properties of a DRG, in accordance with an example embodiment.

FIG. 5 is an example of a second directional relation graph 501 representing the relationships between various diagnostic routines and services that shows various properties of a DRG, in accordance with an example embodiment. As illustrated in FIG. 5, node weights and the directions of the edges can be useful in identifying the source of problems, e.g., a pair of nodes 506-1 and a set of nodes 506-2, and adjusting the set of diagnostics to be run as well as determining the time for performing the diagnostics. In one example embodiment, the diagnostic time window represented by the directional relation graphs 500 or 501 can be set by a user.

Figures 6A, 6B, 6C:
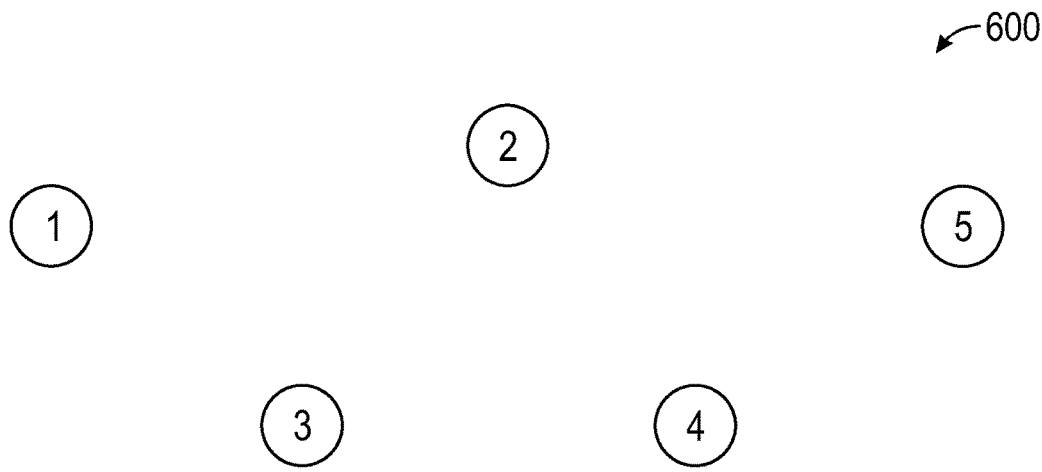
FIG. 6A is an example directional relation graph template representing five diagnostic tests after initialization, in accordance with an example embodiment.
FIG. 6B is an example diagnostic log representing the results of the five diagnostic tests performed at three different times of day, in accordance with an example embodiment.
FIG. 6C illustrates an adjacency matrix template after initialization for the diagnostic log of FIG. 6B, in accordance with an example embodiment.

FIG. 6A is an example directional relation graph template 600 (after initialization) representing five diagnostic tests, in accordance with an example embodiment. FIG. 6B is an example diagnostic log 620 representing the results of the five diagnostic tests performed at three different times of day, in accordance with an example embodiment. Each row 624 represents the results of running the five diagnostic tests at the time specified in the first column. The remaining columns display results corresponding to each of the diagnostic tests represented via the directional relation graph template 600. As illustrated in FIG. 6B, Diag1 passed during all three diagnostic runs, Diag4 failed during all three diagnostic runs, and the remaining diagnostic tests had differing results during the three runs. FIG. 6C illustrates an adjacency matrix template 650 after initialization of the entries 632 for the diagnostic log of FIG. 6B.

Figures 7A, 7B, 7C:
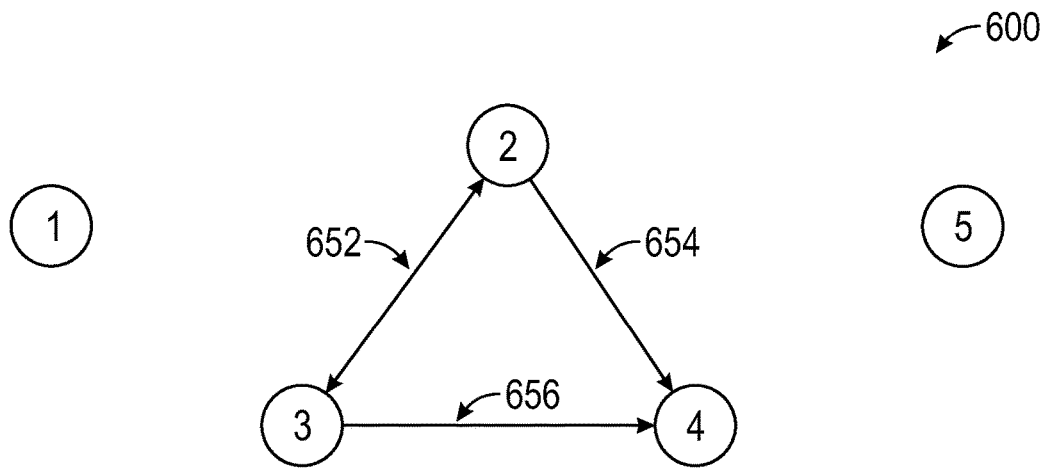
FIG. 7A illustrates a directional relation graph based on the directional relation graph template of FIG. 6A and representing the relationships between various diagnostic routines and services, in accordance with an example embodiment.
FIG. 7B is an example diagnostic log representing the results of the five diagnostic tests performed at three different times of day, in accordance with an example embodiment.
FIG. 7C illustrates the adjacency matrix template of FIG. 6C after incorporating the first set of diagnostic results of the diagnostic log of FIG. 6B, in accordance with an example embodiment.

FIG. 7A illustrates a directional relation graph based on the directional relation graph template 600 of FIG. 6A and representing the relationships between various diagnostic routines and services, in accordance with an example embodiment. The arrows 652, 654, 656 represent the incorporation of the first set of diagnostic results of the diagnostic log of FIG. 6B (as highlighted in FIG. 7B). FIG. 7C illustrates the adjacency matrix template 650 of FIG. 6C after revising the entries 632 to incorporate the first set of diagnostic results of the diagnostic log of FIG. 6B, in accordance with an example embodiment. In the first set of diagnostic results, Diag2, Diag3, and Diag4 all failed and the remaining diagnostics passed. Thus, the failures of Diag2, Diag3, and Diag4 are correlated with each other, as indicated by the number one's in the revised adjacency matrix template 650 of FIG. 7C and as indicated by the arrows 652, 654, 656 in the revised directional relation graph template 600 of FIG. 7A. Note that the bidirectional arrows indicate that the nature of the relationship is assumed to be bi-directional at this point, that is, it is not known if one of the pair of diagnostics triggers a failure by the other of the pair of diagnostics.

Figures 8A, 8B, 8C:
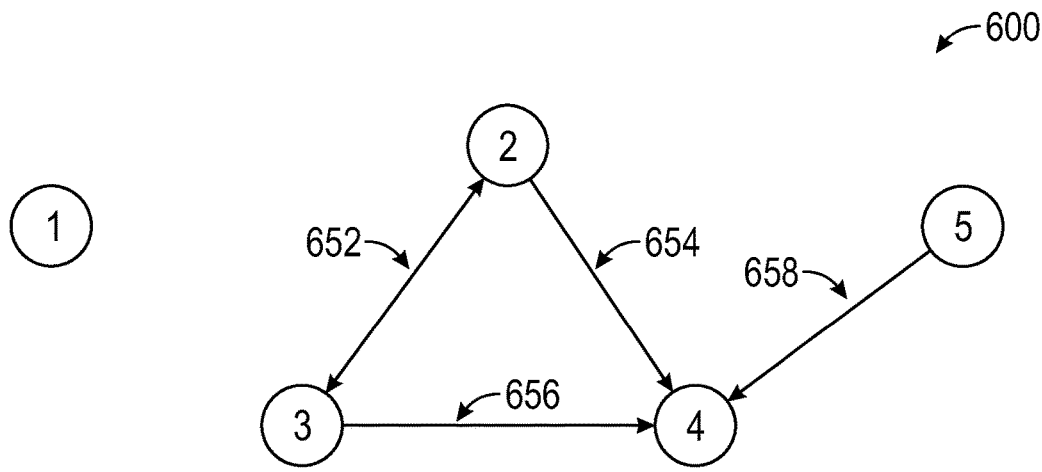
FIG. 8A illustrates a directional relation graph based on the directional relation graph template of FIG. 6A and representing the relationships between various diagnostic routines and services, in accordance with an example embodiment.
FIG. 8B is an example diagnostic log representing the results of the five diagnostic tests performed at three different times of day, in accordance with an example embodiment.
FIG. 8C illustrates the adjacency matrix template of FIG. 6C after incorporating the first and second sets of diagnostic results of the diagnostic log of FIG. 7B, in accordance with an example embodiment.

FIG. 8A illustrates a directional relation graph based on the directional relation graph template 600 of FIG. 6A and representing the relationships between various diagnostic routines and services, in accordance with an example embodiment. The arrows 652, 654, 656, 658 represent the incorporation of the first and second sets of diagnostic results of the diagnostic log of FIG. 6B (as highlighted in FIG. 8B). FIG. 8C illustrates the adjacency matrix template 650 of FIG. 6C after revising the entries 632 to incorporate the first and second sets of diagnostic results of the diagnostic log of FIG. 6B, in accordance with an example embodiment. In the second set of diagnostic results, Diag4 and Diag5 failed and the remaining diagnostics passed. Thus, the failures of Diag4 and Diag5 are correlated with each other, as indicated by the one's in the revised adjacency matrix template 650 of FIG. 8C and as indicated by the arrows 652, 654, 656, 658 in the revised directional relation graph template 600 of FIG. 8A.

In addition, since Diag2 and Diag3 passed while Diag4 failed, it is assumed that the earlier failure of Diag2 and Diag3 during the first performance of the diagnostics was not precipitated by the failure of Diag4. Thus, the arrows 654, 656 between Diag4 to Diag2 and Diag4 to Diag3 are now unidirectional, and the corresponding entries 632 in the adjacency matrix template 650 have been reset to zero.

Figures 9A, 9B, 9C:
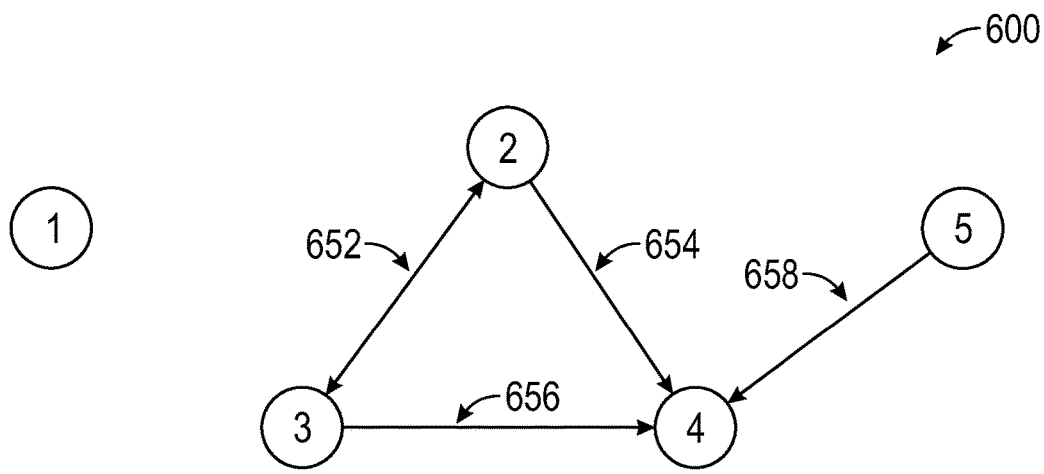
FIG. 9A illustrates a directional relation graph based on the directional relation graph template of FIG. 6A and representing the relationships between various diagnostic routines and services, in accordance with an example embodiment.
FIG. 9B is an example diagnostic log representing the results of the five diagnostic tests performed at three different times of day, in accordance with an example embodiment.
FIG. 9C illustrates the adjacency matrix template of FIG. 6C after incorporating the first, second, and third sets of diagnostic results of the diagnostic log of FIG. 8B, in accordance with an example embodiment.

FIG. 9A illustrates a directional relation graph based on the directional relation graph template 600 template 600 of FIG. 6A and representing the relationships between various diagnostic routines and services, in accordance with an example embodiment. The arrows 652, 654, 656, 658 represent the incorporation of the first, second, and third sets of diagnostic results of the diagnostic log of FIG. 6B (as highlighted in FIG. 9B). FIG. 9C illustrates the adjacency matrix template 650 of FIG. 6C after revising the entries 632 to incorporate the first, second, and third sets of diagnostic results of the diagnostic log of FIG. 6B, in accordance with an example embodiment. In the third set of diagnostic results, Diag4 failed, Diag1 and Diag5 passed, and the remaining diagnostics have no result (no data). In addition, since Diag5 passed while Diag4 failed, it is assumed that the earlier failure of Diag5 was not precipitated by the failure of Diag4. Thus, the arrow 658 between Diag4 to Diag5 is now unidirectional, and the corresponding entry 632 in the adjacency matrix template 650 has been reset to zero.

Methods for Changing Diagnostic Interval:

In one example embodiment, the time for performing diagnostics is determined based on the environmental data (env_data), hardware data (hw_data), and application data (app_data). In one example embodiment, the diagnostic interval i_diag is defined as f(parameters(directional relation graph), metadata). For example:

$$\text{interval\_diag}(node\_i, diag\_i) = \text{baseline\_interval} - (\text{coef1} * \text{meta\_i} + \text{coef2} * \text{node\_weight\_}ij + \text{coef3} * \text{sum}(\text{edge\_weight\_}i \text{ to all})$$

where metadata_i=temperature of node_i; node_weight_ij=number of failures of diag j on node_i; and sum(edge_weight_i to all)=sum of number of diagnostic failures occurring during the same time interval.

One of ordinary skill in the art would understand that the information collected by the diagnostic analyzer 428 will depend on the application and that a variety of information can be collected and processed according to embodiments of the present invention. As described more fully above, the diagnostic analyzer 428 collects information on software (such as the applications 404) and hardware (such as CPUs), environmental data (such as the temperature of a processor), and the like, and analyzes the data to select a set of diagnostic routines and services for specific hardware, applications 404, and the like.

For example, diagnostics may be run more frequently for hardware experiencing higher temperatures (nodes that have higher meta_i), components experiencing more failures (nodes that have higher node_weight), components experiencing more common failures (nodes that have higher sum(edge_weight_i to all)), and the like. For example, diagnostics may be run at a frequency proportional to hardware temperatures, a rate of component failure, a rate of common failures, and the like. As noted above, hardware in harsher environments, such as hardware experiencing higher temperatures, are more likely to be malfunctioning and malfunctioning hardware is more likely to malfunction again in the future.

Methods for Selecting a Set of Diagnostic Routines and Services:

In one example embodiment, diagnostics are prioritized (such as from −20 to +20) where the lower integer indicates a higher priority diagnostic and excludes only the low priority diagnostics, such as the one(s) where the priority is less than zero. The prioritization can be performed dynamically or manually with, for example, the help of a domain specialist. In one example embodiment, graph search algorithms (such as spanning tree, shortest path, and the like) can be used to serialize diagnostics and reduce the number of diagnostic tests. For example, if the following diagnostic failure chain, 1→5→4→8, is revealed in the directional relation graph, the diagnostics to be run can be reduced. In particular, since failures by diagnostics 1 and 8 may be indicative of failures by diagnostics 5 and 4, a decision to run diagnostics 1 and 8 and abstain from running diagnostics 5 and 4 may be made. In one example embodiment, the clustered diagnostics are ranked based on run time and only the diagnostics with the shorter run times are run to minimize the number of tests. For example, if some diagnostics are always clustered together with bidirectional associations in the directional relation graph (that is, their tests fail together at all times), these clustered diagnostics can be ranked based on their diagnostic run times, and the diagnostic(s) that have the shortest run times for each set of redundant diagnostics can be run instead of running all of the clustered diagnostics.

Figure 10:
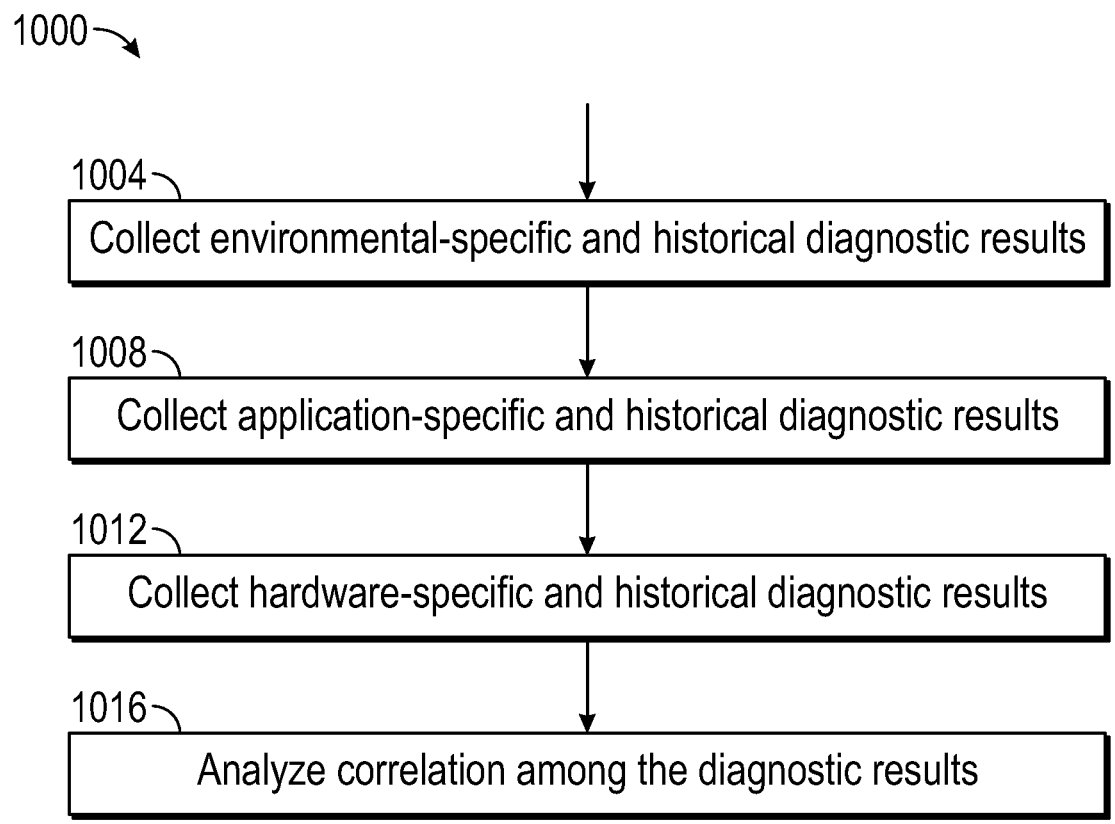
FIG. 10 is a flowchart for an example method for selecting and running diagnostic routines and/or services, in accordance with an example embodiment.

FIG. 10 is a flowchart for an example method 1000 for selecting and running diagnostic routines and/or services, in accordance with an example embodiment. In one example embodiment, environmental-specific and historical diagnostic results are collected (operation 1004), application-specific and historical diagnostic results are collected (operation 1008), hardware-specific and historical diagnostic results are collected (operation 1012), and the correlation among the diagnostic results are analyzed (operation 1016). Diagnostics which are necessary to detect any hardware or software defect are conditionally selected (operation 1020).

Visually Analyzing Diagnostic Results:

Returning again to FIG. 4, in one example embodiment, clusters 504-1, 504-2 of diagnostic nodes in the directional relation graph are identified since each cluster 504-1, 504-2 may be related to a different problem or issue. Each cluster 504-1, 504-2 is then analyzed to determine a potential source of a problem. For example, the direction of arrows can be traced backwards to a diagnostic node(s), (for example, node 21 in cluster 504-1 has 3 outbound arrows and 1 inbound arrow) (and corresponding component(s)), that may be the root cause of the problem. The node weights (the size of the nodes) can be analyzed to find the potentially more important problems, e.g., node 20 in cluster 504-2 has a relatively high weight, as determined by, for example, the frequency of failures (i.e., the size of the nodes). In addition, the number of outgoing and incoming arrows and corresponding edge weights can be analyzed to find the more common failures and more common problems. Similar analyses can be applied to the graph 501 of FIG. 5.

Figure 11A:
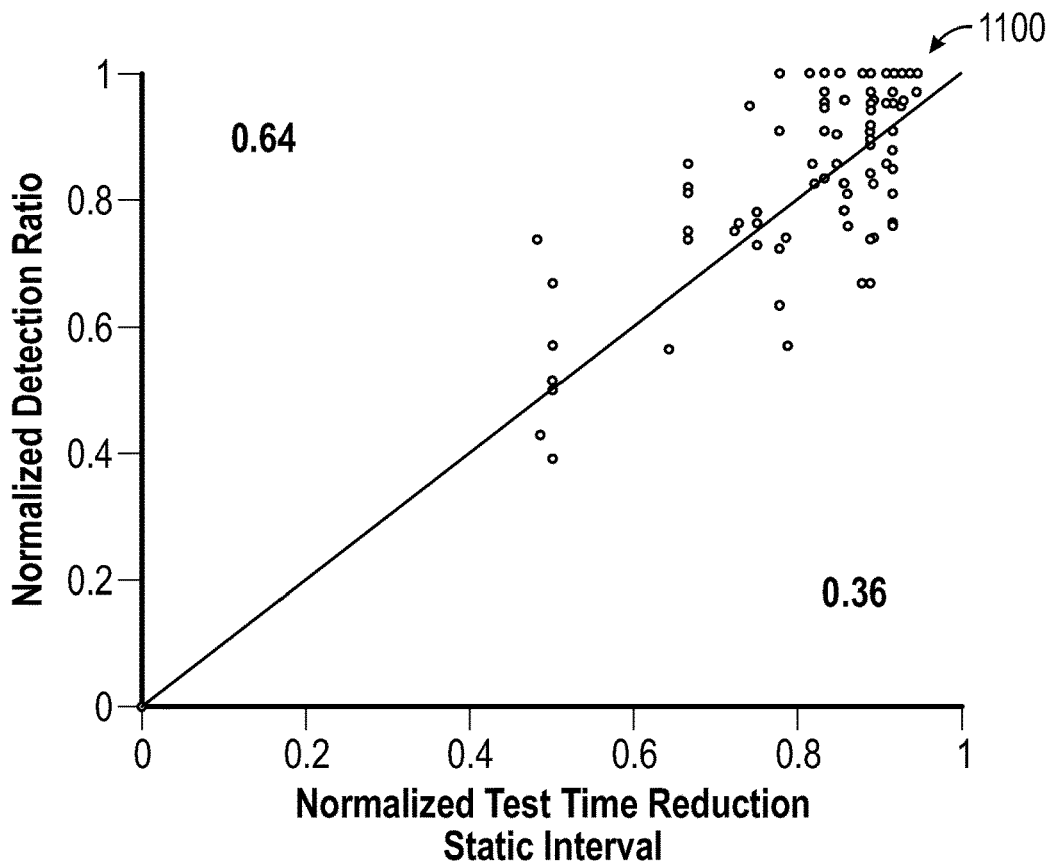
FIG. 11A is an example graph of a normalized detection ratio versus normalized test time reduction for a set of diagnostics for a given static time interval, in accordance with an example embodiment.
Figure 11B:
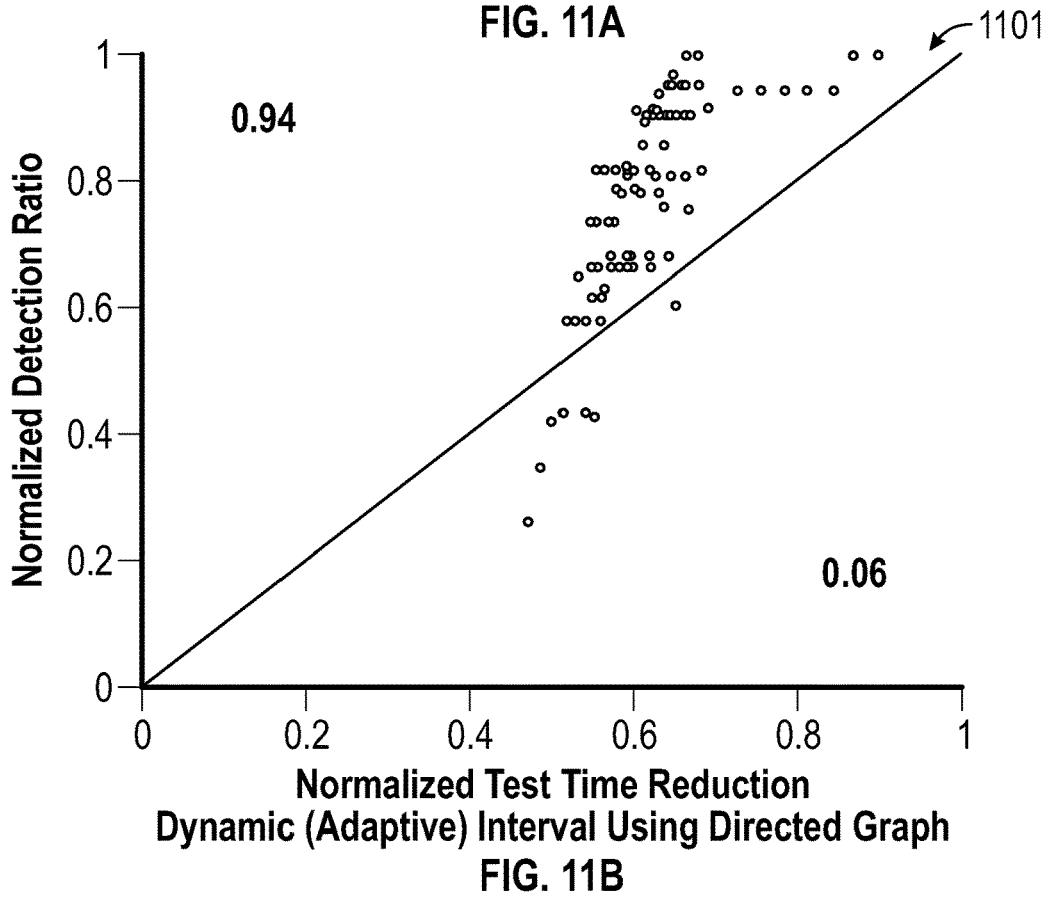
FIG. 11B is an example graph of a normalized detection ratio versus normalized test time reduction for a set of diagnostics for a given dynamic time interval, in accordance with an example embodiment.

FIG. 11A is an example graph 1100 of a normalized detection ratio versus normalized test time reduction for a set of diagnostics for a given static time interval, in accordance with an example embodiment. FIG. 11B is an example graph 1101 of a normalized detection ratio versus normalized test time reduction for a set of diagnostics for a given dynamic time interval, in accordance with an example embodiment. The normalized detection ratio is the detected failures with reduced tests per total failures and the normalized test time reduction is the test time with reduced tests per the test time with total tests.

Figure 12:
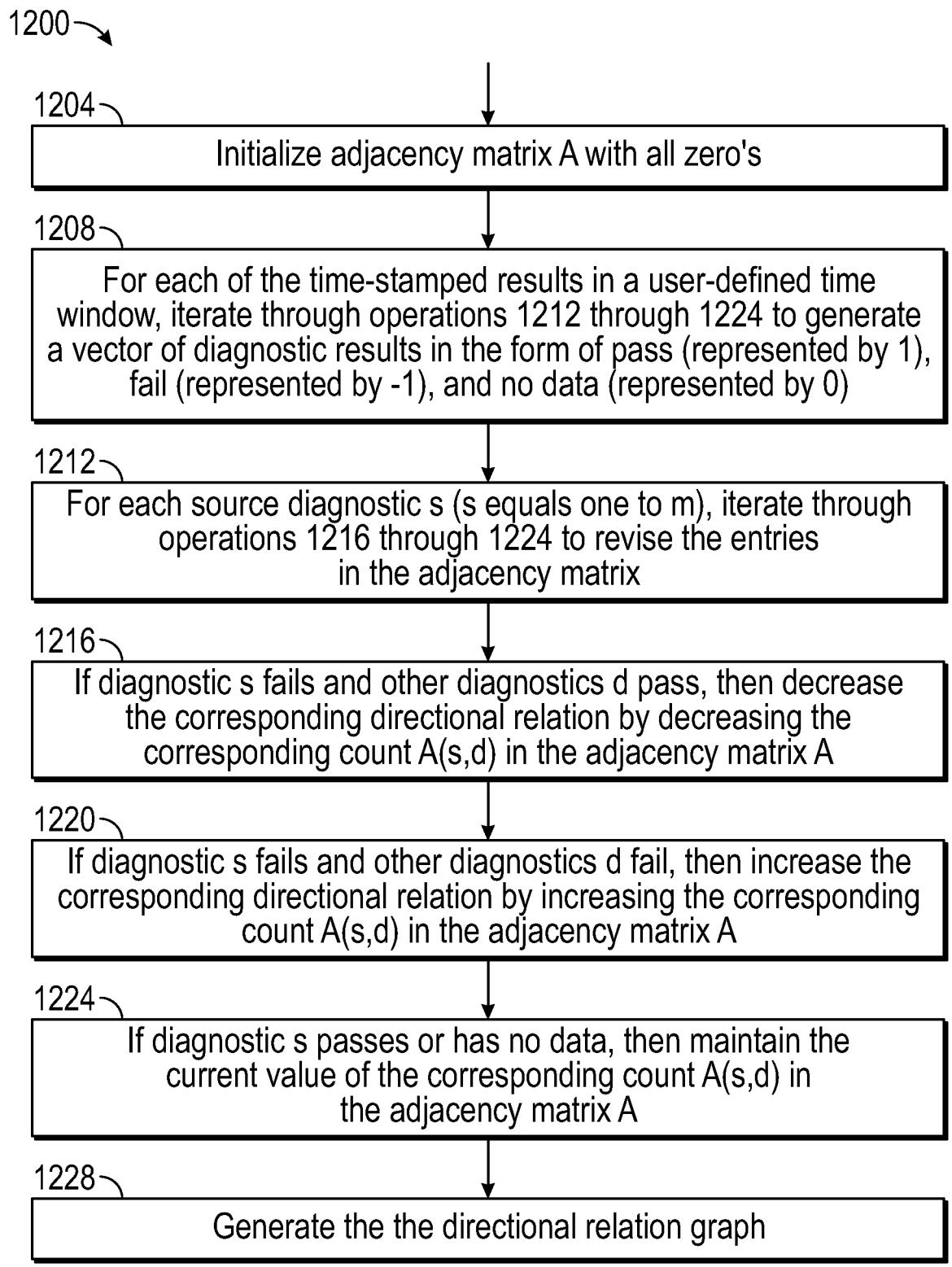
FIG. 12 is a flowchart for an example method for generating the adjacency matrix and the directional relation graph, in accordance with an example embodiment.

FIG. 12 is a flowchart for an example method 1200 for generating an adjacency matrix and a directional relation graph, in accordance with an example embodiment. In one example embodiment, an adjacency matrix A is initialized with all zero's where the row of the adjacency matrix corresponds to the source diagnostic, the column of the adjacency matrix corresponds to the destination diagnostic, and m represents the total number of diagnostics (operation 1204). For each of the time-stamped results in a user-defined time window, iterate through operations 1212 through 1224 to generate a vector of diagnostic results in the form, for example, of pass (represented by 1), fail (represented by −1), and no data (represented by 0) (operation 1208). For each source diagnostic s (for s equals one to m), iterate through operations 1216 through 1224 to revise the entries in the adjacency matrix (operation 1212). During operation 1216, if diagnostic s fails and other diagnostics d pass, then decrease the corresponding directional relation by decreasing the corresponding count A(s,d) in the adjacency matrix A. During operation 1220, if diagnostic s fails and other diagnostics d fail, then increase the corresponding directional relation by increasing the corresponding count A(s,d) in the adjacency matrix A. During operation 1224, if diagnostic s passes or has no data, then maintain the current value of the corresponding count A(s,d) in the adjacency matrix A. Once the adjacency matrix A is complete, generate the directional relation graph based on the completed adjacency matrix A (operation 1228). In one example embodiment, if another condition of the diagnostic result has any significant meaning, the adjacency matrix can be updated in different ways. For example, if no response has a meaning in the system, the adjacency matrix can be revised accordingly.

Given the discussion thus far, it will be appreciated that, in general terms, an exemplary method for generating an adjacency matrix A and a directional relation graph representing a relationship between one or more diagnostics, according to an aspect of the invention, includes the operations of initializing the adjacency matrix with all zero's (operation 1204), where a row of the adjacency matrix A corresponds to a source diagnostic s of the one or more diagnostics, a column of the adjacency matrix A corresponds to a destination diagnostic d of the one or more diagnostics, and m represents a total count of the diagnostics; revising one or more entries in the adjacency matrix A by, for each source diagnostics, decreasing a corresponding count A(s,d) in the adjacency matrix A to decrease a corresponding directional relation in response to the diagnostic s failing and one or more other diagnostics d passing (operations 1216); increasing the corresponding count A(s,d) in the adjacency matrix A to increase the corresponding directional relation in response to the diagnostic s failing and one or more other diagnostics d failing (operations 1220); and maintaining a current value of the corresponding count A(s,d) in the adjacency matrix A in response to the diagnostic s passing or having no corresponding data (operations 1224); and generating the directional relation graph based on the adjacency matrix A (operations 1228).

In one example embodiment, the revising operation is repeated for each of two or more time-stamped results in a user-defined time window. In one example embodiment, a diagnostic result is represented in the adjacency matrix A by a one if the diagnostic passed, a −1 if the diagnostic failed, and a 0 if no diagnostic data is obtained. In one example embodiment, a size of each node in the directional relation graph represents a frequency of failure of a corresponding diagnostic within a certain time window. In one example embodiment, an edge weight in the directional relation graph represents a strength of a relation between two of the diagnostics. In one example embodiment, the edge weight is based on a count of mutual diagnostic failures. In one example embodiment, one or more clusters of nodes in the directional graph are identified. In one example embodiment, the one or more clusters are analyzed to determine a potential source of a diagnostic failure.

In one aspect, a non-transitory computer readable medium comprising computer executable instructions which when executed by a computer cause the computer to perform the method of: initializing the adjacency matrix with all zero's (operation 1204), where a row of the adjacency matrix A corresponds to a source diagnostic s of the one or more diagnostics, a column of the adjacency matrix A corresponds to a destination diagnostic d of the one or more diagnostics, and m represents a total count of the diagnostics; revising one or more entries in the adjacency matrix A by, for each source diagnostics, decreasing a corresponding count A(s,d) in the adjacency matrix A to decrease a corresponding directional relation in response to the diagnostic s failing and one or more other diagnostics d passing (operation 1216); increasing the corresponding count A(s,d) in the adjacency matrix A to increase the corresponding directional relation in response to the diagnostic s failing and one or more other diagnostics d failing (operation 1220); and maintaining a current value of the corresponding count A(s,d) in the adjacency matrix A in response to the diagnostic s passing or having no corresponding data (operation 1224); and generating the directional relation graph based on the adjacency matrix A (operation 1228).

In one aspect, an apparatus for generating an adjacency matrix A and a directional relation graph representing a relationship between one or more diagnostics, the apparatus comprising at least one processor and a memory storing instructions which, when executed by the at least one processor, cause the mobile device to perform a method comprising: initializing the adjacency matrix with all zero's (operation 1204), where a row of the adjacency matrix A corresponds to a source diagnostics of the one or more diagnostics, a column of the adjacency matrix A corresponds to a destination diagnostic d of the one or more diagnostics, and m represents a total count of the diagnostics; revising one or more entries in the adjacency matrix A by, for each source diagnostic s, decreasing a corresponding count A(s,d) in the adjacency matrix A to decrease a corresponding directional relation in response to the diagnostic s failing and one or more other diagnostics d passing (operation 1216); increasing the corresponding count A(s,d) in the adjacency matrix A to increase the corresponding directional relation in response to the diagnostic s failing and one or more other diagnostics d failing (operation 1220); and maintaining a current value of the corresponding count A(s,d) in the adjacency matrix A in response to the diagnostic s passing or having no corresponding data (operation 1224); and generating the directional relation graph based on the adjacency matrix A (operation 1228).

Figure 13:
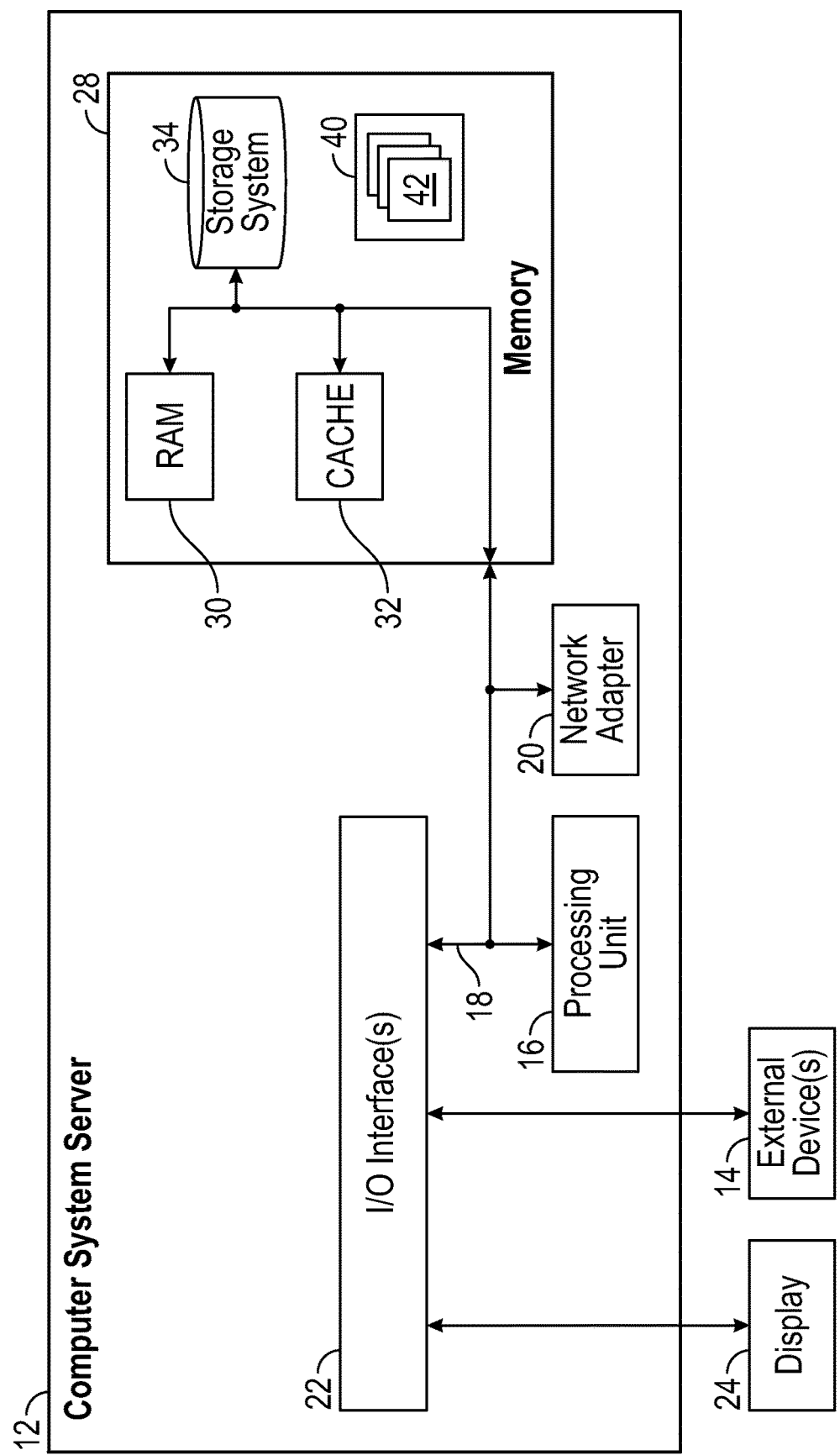
FIG. 13 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 13 depicts a computer system that may be useful in implementing one or more aspects and/or elements of the invention, also representative of a cloud computing node according to an embodiment of the present invention. Referring now to FIG. 13, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 13, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 13) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating an adjacency matrix A and a directional relation graph representing a relationship between one or more diagnostics, the method comprising:

initializing the adjacency matrix with all zero's, where a row of the adjacency matrix A corresponds to a source diagnostic s of the one or more diagnostics, a column of the adjacency matrix A corresponds to a destination diagnostic d of the one or more diagnostics, and m represents a total count of the diagnostics;

revising one or more entries in the adjacency matrix A by, for each source diagnostics, decreasing a corresponding count A(s,d) in the adjacency matrix A to decrease a corresponding directional relation in response to the diagnostic s failing and one or more other diagnostics d passing; increasing the corresponding count A(s,d) in the adjacency matrix A to increase the corresponding directional relation in response to the diagnostic s failing and one or more other diagnostics d failing; and maintaining a current value of the corresponding count A(s,d) in the adjacency matrix A in response to the diagnostics passing or having no corresponding data; and generating the directional relation graph based on the adjacency matrix A.

2. The method of claim 1, further comprising repeating the revising operation for each of two or more time-stamped results in a user-defined time window.

3. The method of claim 1, wherein a diagnostic result is represented in the adjacency matrix A by a one if the diagnostic passed, a −1 if the diagnostic failed, and a 0 in any other case.

4. The method of claim 1, wherein a size of each node in the directional relation graph represents a frequency of failure of a corresponding diagnostic within a certain time window.

5. The method of claim 1, wherein an edge weight in the directional relation graph represents a strength of a relation between two of the diagnostics.

6. The method of claim 5, wherein the edge weight is based on a count of mutual diagnostic failures.

7. The method of claim 1, further comprising identifying one or more clusters of nodes in the directional relation graph.

8. The method of claim 7, further comprising analyzing the one or more clusters to determine a potential source of a diagnostic failure.

9. A non-transitory computer readable medium comprising computer executable instructions which when executed by a computer cause the computer to perform the method of:

initializing the adjacency matrix with all zero's, where a row of the adjacency matrix A corresponds to a source diagnostic s of the one or more diagnostics, a column of the adjacency matrix A corresponds to a destination diagnostic d of the one or more diagnostics, and m represents a total count of the diagnostics;

revising one or more entries in the adjacency matrix A by, for each source diagnostics, decreasing a corresponding count A(s,d) in the adjacency matrix A to decrease a corresponding directional relation in response to the diagnostic s failing and one or more other diagnostics d passing; increasing the corresponding count A(s,d) in the adjacency matrix A to increase the corresponding directional relation in response to the diagnostic s failing and one or more other diagnostics d failing; and maintaining a current value of the corresponding count A(s,d) in the adjacency matrix A in response to the diagnostics passing or having no corresponding data; and generating the directional relation graph based on the adjacency matrix A.

10. The non-transitory computer readable medium of claim 9, the method further comprising identifying one or more clusters of nodes in the directional relation graph.

11. The non-transitory computer readable medium of claim 10, the method further comprising analyzing the one or more clusters to determine a potential source of a diagnostic failure.

12. An apparatus for generating an adjacency matrix A and a directional relation graph representing a relationship between one or more diagnostics, the apparatus comprising:

at least one processor; and a memory storing instructions which, when executed by the at least one processor, cause the mobile device to perform a method comprising:

initializing the adjacency matrix with all zero's, where a row of the adjacency matrix A corresponds to a source diagnostic s of the one or more diagnostics, a column of the adjacency matrix A corresponds to a destination diagnostic d of the one or more diagnostics, and m represents a total count of the diagnostics;

revising one or more entries in the adjacency matrix A by, for each source diagnostics, decreasing a corresponding count A(s,d) in the adjacency matrix A to decrease a corresponding directional relation in response to the diagnostic s failing and one or more other diagnostics d passing; increasing the corresponding count A(s,d) in the adjacency matrix A to increase the corresponding directional relation in response to the diagnostic s failing and one or more other diagnostics d failing; and maintaining a current value of the corresponding count A(s,d) in the adjacency matrix A in response to the diagnostics passing or having no corresponding data; and generating the directional relation graph based on the adjacency matrix A.

13. The apparatus of claim 12, the method further comprising repeating the revising operation for each of two or more time-stamped results in a user-defined time window.

14. The apparatus of claim 12, wherein a diagnostic result is represented in the adjacency matrix A by a one if the diagnostic passed, a −1 if the diagnostic failed, and a 0 in any other case.

15. The apparatus of claim 12, wherein a size of each node in the directional relation graph represents a frequency of failure of a corresponding diagnostic within a certain time window.

16. The apparatus of claim 12, wherein an edge weight in the directional relation graph represents a strength of a relation between two of the diagnostics.

17. The apparatus of claim 16, wherein the edge weight is based on a count of mutual diagnostic failures.

18. The apparatus of claim 12, the method further comprising identifying one or more clusters of nodes in the directional relation graph.

19. The apparatus of claim 18, the method further comprising analyzing the one or more clusters to determine a potential source of a diagnostic failure.

* * * * *